(12) United States Patent
Martin

(10) Patent No.: US 10,318,014 B2
(45) Date of Patent: Jun. 11, 2019

(54) OPTICAL POINTER ILLUMINATION

(71) Applicant: Hewlett-Packard Development Company, L.P., Houston, TX (US)

(72) Inventor: Robert Paul Martin, Fort Collins, CO (US)

(73) Assignee: Hewlett-Packard Development Company, L.P., Spring, TX (US)

(*) Notice: Subject to any disclaimer, the term of this patent is extended or adjusted under 35 U.S.C. 154(b) by 189 days.

(21) Appl. No.: 15/114,743

(22) PCT Filed: Jan. 31, 2014

(86) PCT No.: PCT/US2014/014131
§ 371 (c)(1),
(2) Date: Jul. 27, 2016

(87) PCT Pub. No.: WO2015/116160
PCT Pub. Date: Aug. 6, 2015

(65) Prior Publication Data
US 2016/0342226 A1    Nov. 24, 2016

(51) Int. Cl.
G09G 3/36 (2006.01)
G06F 3/03 (2006.01)
G06F 3/0354 (2013.01)
G09G 3/34 (2006.01)

(52) U.S. Cl.
CPC ........ G06F 3/0321 (2013.01); G06F 3/03545 (2013.01); G09G 3/3406 (2013.01); G09G 3/36 (2013.01); G09G 2320/0686 (2013.01)

(58) Field of Classification Search
CPC ......... G06F 3/0321; G06F 3/36; G06F 3/3406
USPC .......................................... 345/158, 175, 179
See application file for complete search history.

(56) References Cited

U.S. PATENT DOCUMENTS

| | | | |
|---|---|---|---|
| 7,421,111 B2 | 9/2008 | Dietz et al. | |
| 8,646,689 B2* | 2/2014 | Moed ................ | G06K 7/10722 235/462.01 |
| 9,319,735 B2* | 4/2016 | Knee ................ | H04N 21/4325 |
| 2008/0055494 A1 | 3/2008 | Cernasov | |
| 2008/0111833 A1 | 5/2008 | Thorn et al. | |
| 2011/0227827 A1* | 9/2011 | Solomon ............ | G06F 3/0321 345/158 |
| 2012/0127114 A1 | 5/2012 | Weaver et al. | |
| 2012/0293457 A1 | 11/2012 | Agari et al. | |
| 2013/0044083 A1 | 2/2013 | Basnett et al. | |
| 2013/0153787 A1 | 6/2013 | Geaghan et al. | |
| 2013/0207937 A1 | 8/2013 | Lutian et al. | |
| 2013/0308066 A1 | 11/2013 | Thomas | |
| 2014/0368456 A1* | 12/2014 | Sakai ................ | G06F 3/0488 345/173 |

OTHER PUBLICATIONS

Dinh-Tuan Ngo, Peter, "A New and Simple Light-Pen Position-Detection Technique for Interactive Plasma-Display Systems." IEEE Transactions on Electron Devices, vol. Ed-23, No. 9, Sep. 1976, pp. 1058-1063, IEEE.

* cited by examiner

Primary Examiner — Calvin C Ma
(74) Attorney, Agent, or Firm — Fabian VanCott

(57) ABSTRACT

An example system includes a display; an optical pointer driver to receive an indication of an optical pointer location on the display; and a graphics driver to receive the indication of the optical pointer location and adjust an illumination of graphics in a vicinity of the indicated location.

20 Claims, 4 Drawing Sheets

OPTICAL POINTER ILLUMINATION

CROSS-REFERENCE TO RELATED APPLICATION

This application is a U.S. National Stage Application of and claims priority to International Patent Application No. PCT/US2014/014131, filed on Jan. 31, 2014, and entitled "OPTICAL POINTER ILLUMINATION," which is hereby incorporated by reference in its entirety.

BACKGROUND

Modern industrial design continues to increase reliance on combined input/output devices. Devices such as capacitive or resistive touch screens provide an elegant, simple, and industrially clean design for providing both input (touch) and output (display) capabilities. A touchscreen can be formed by placing a transparent overlay proximate the display surface. Such overlays typically detect the presence and location of input (e.g., a touch) based upon a change in electrical properties of the overlay.

BRIEF DESCRIPTION OF THE DRAWINGS

For a more complete understanding of various examples, reference is now made to the following description taken in connection with the accompanying drawings in which.

DETAILED DESCRIPTION

Figure 1:
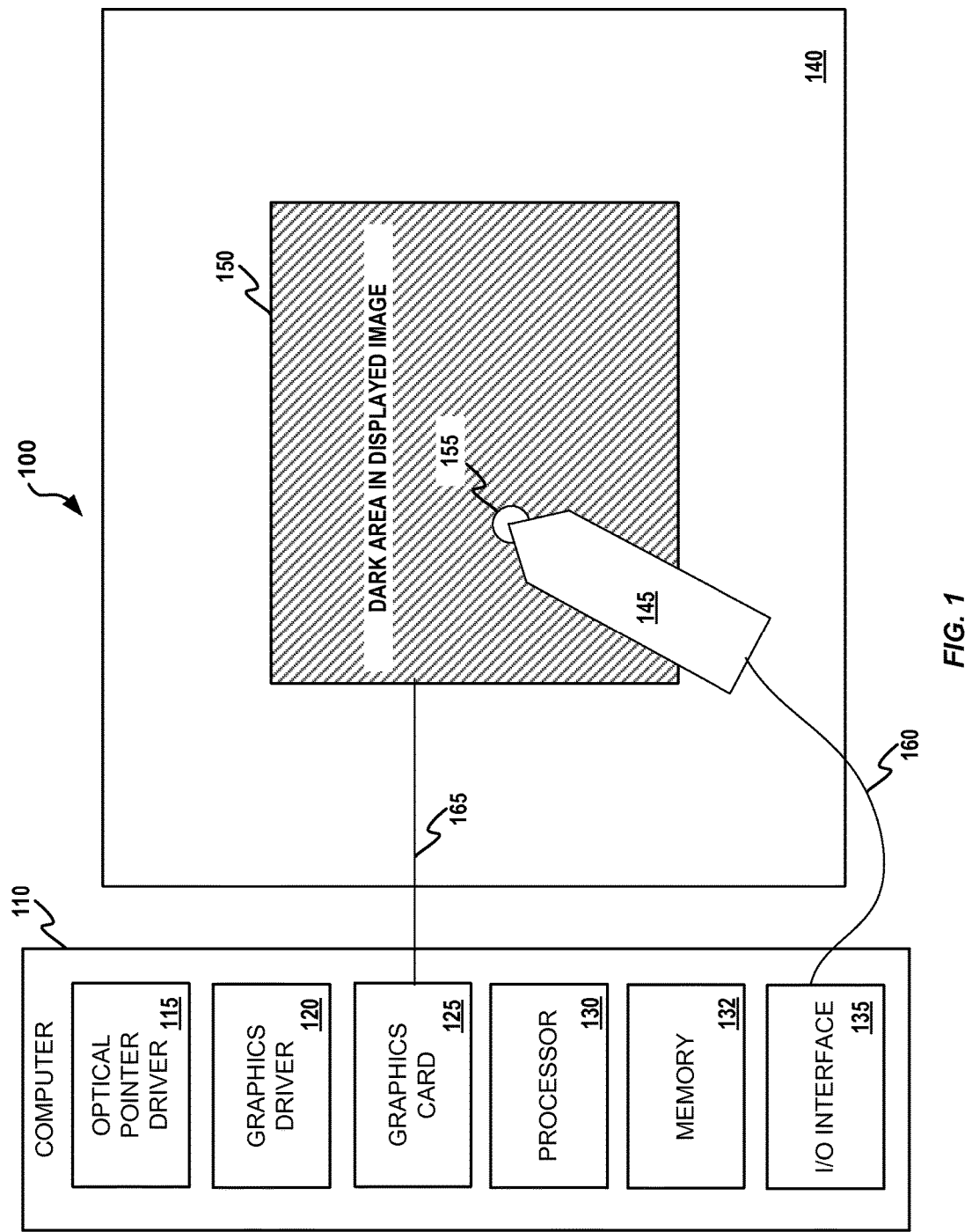
FIG. 1 illustrates an example positional input system.

While the level of touch accuracy and resolution using touchscreen devices is sufficient for many consumer electronics, the accuracy and resolution are frequently insufficient for use in professional applications requiring a high degree of touch accuracy and resolution. Examples described herein provide improved detectability of position pattern elements by an optical pointer and provide improved touch accuracy and resolution.

Positional input systems and methods are provided. An illustrative positional input method may include passing a light generated by a source through a predetermined pattern of visibly transparent elements disposed on a surface of a display device. The method may further include an optical pointer detecting a change in the polarization state of the polarized light corresponding to a location on the display device. The method may further include lightening or in some way brightening a displayed image underneath the transparent elements being detected by the optical pointer in order to provide additional illumination behind the transparent elements to improve detectability of light by the optical pointer.

An illustrative positional input system may include a polarized light source and a predetermined pattern of visibly transparent polarizing state altering elements to change the polarization state of the polarized light. The system may further include a detector of an optical pointer to determine a location based upon the encoded element pattern with high resolution positional information being discriminated from their background via the contrast provided by differing polarization state between the position encoding element pattern and its background. The system may further include a graphics driver for lightening or in some way brightening a displayed image underneath the transparent elements being detected by the optical pointer in order to provide additional illumination behind the transparent elements to improve detectability of light by the optical pointer.

As discussed above, positional input systems using active optical pointers may use unique "phase dot" patterns layered on top of displays such as LCD screens, for example, in order to precisely determine location of the optical pointer. Light may be provided via an LCD backlight, passing through layers of the LCD. However, the amount of light available in the case of a dark image area may be insufficient for the optical pointer to detect the dot pattern.

Systems and methods described herein may lighten or in some way brighten a displayed image underneath a position pattern, such as a phase-dot pattern in some examples, to be detected by the optical pointer in order to provide additional illumination behind the position pattern to improve detectability of position pattern elements by the optical pointer.

In has been found that systems and methods described herein may provide adequate light for position pattern detection, in a minimally-visually-invasive way. In some examples, systems and methods described herein may enhance a basic phase-dot optical pointer by assuring illumination is adequate for phase-dot detection regardless of what image is being displayed on the display underneath the phase-dot pattern, while minimizing the visual distraction to a user.

FIG. 1 illustrates an example first positional input system 100 that may include a computer 110, a display 140 and an optical pointer 145. The example computer 110 may include an optical pointer driver 115, a graphics driver 120, a graphics card 125, a processor 130, a memory 132 and an input/output (I/O) interface 135.

The optical pointer driver 115 may receive information indicative of a position of the optical pointer 145 on the display 140. The position information may be received via the I/O interface 135 from a communication channel 160, which may be a wired or wireless connection.

The graphics driver 120 may provide instructions to the graphics card 125, which may be coupled to the display 140 via, as indicated by the line 165 in FIG. 1, in order to drive the display 140 to display various images, windows, frames, videos, etc. The optical pointer driver 115 may communicate with the graphics driver 120 in order to adjust an illumination of graphics in a whitespot, or illumination area 155 in a vicinity of the optical pointer 145, on the display 140. In the example of FIG. 1, the illumination area 155 is in the form of a circle centered at a tip of the optical pointer 145. The illumination area 155 is located in a dark area 150 of a displayed image.

The graphics driver may provide for the adjusted illumination of graphics in the illumination area 155 based on position information received from the optical pointer driver 115 by modifying data in a vicinity of the received position in either a frame buffer, an overlay plane, or a display refresh pipeline (e.g., HW Cursor support), for example, which may be provided in the graphics card 125. In the case of providing the illumination area 155 by means of the display refresh pipeline, the adjustment may not require any writes and/or restores to the frame buffer or overlay planes to enable, disable, and/or move the illumination area 155, and may also enable low latency in tracking the optical pointer position. The optical pointer driver 115 and the graphics driver 120 may work together to move the illumination area 155 based on a location of the optical pointer 145 and may also predict motion and future locations of the optical pointer 145, and therefore the illumination area 155, based on motion vectors that may be based on past positions of the optical pointer 145, for example.

In various examples, the memory 132 may be a non-transitory memory device. In various examples, the memory 132 may be integrally formed with the processor 130 or may be an external memory device. The memory device 132 may include program code that may be executed by the processor 130. For example, one or more modules may be performed to execute processes as described below.

Figure 3:
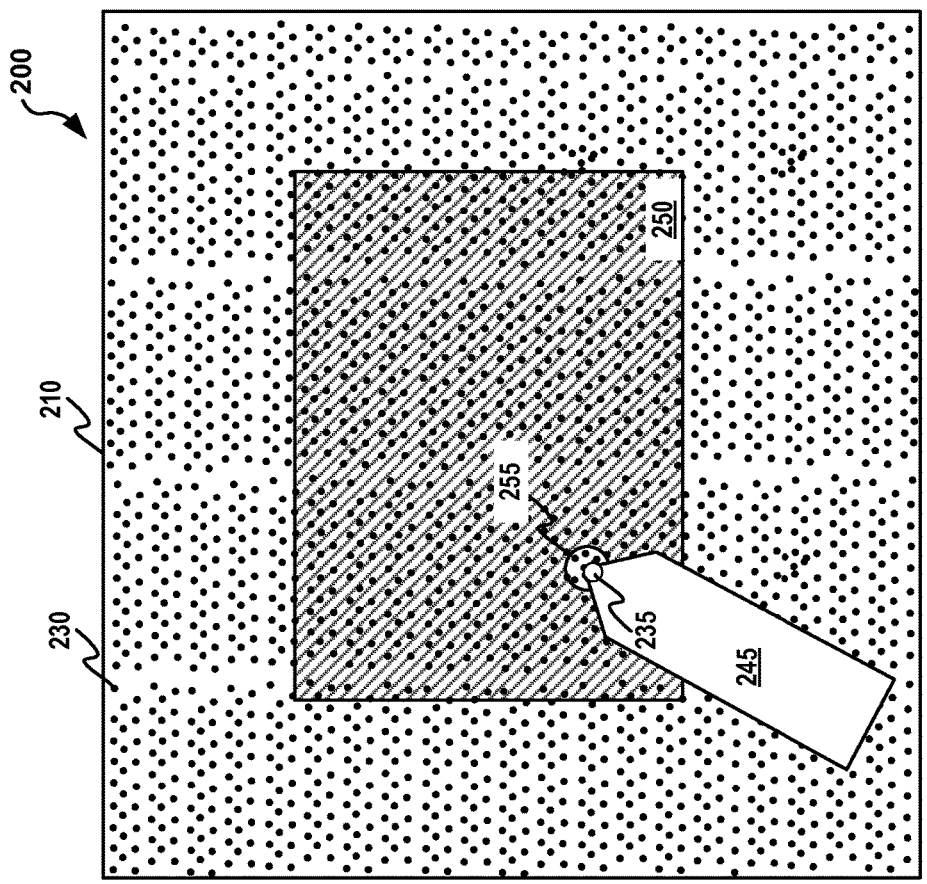
FIG. 3 illustrates a front view of the example positional input system of FIG. 2.
Figure 2:
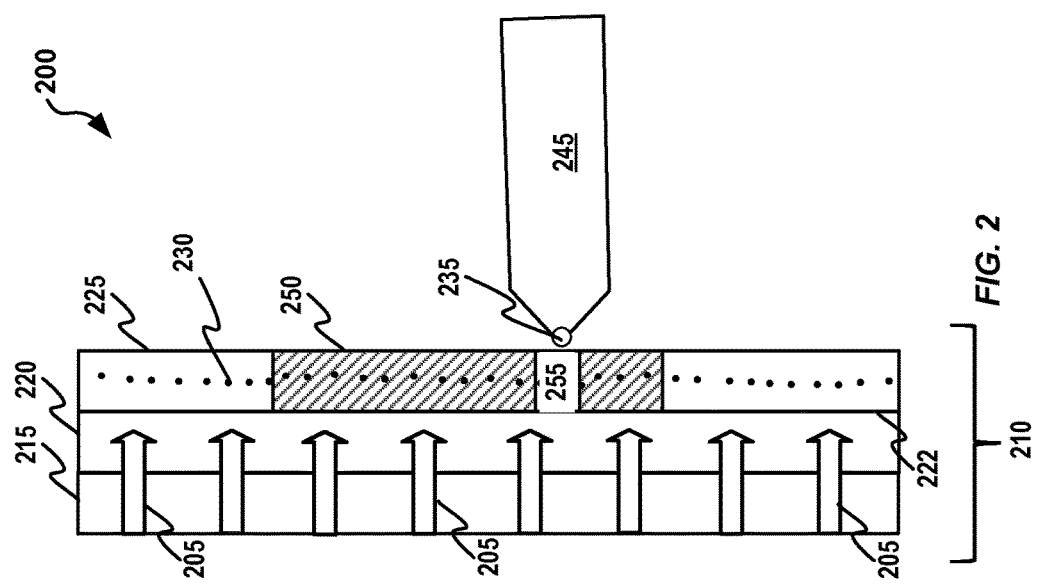
FIG. 2 illustrates a cross-sectional view of another example positional input system.

FIGS. 2 and 3 illustrate side and front views, respectively, depicting an example second positional input system 200 including an optical pointer 245 and a display 210. The display 210 may use a polarized backlight 215, according to this example. The polarized backlight 215 may provide light having a first polarization state 205. The polarized backlight 215 may be within or proximate to the display 210 including a display layer 220 having a surface 222. A carrier 225 may have a predetermined pattern of visibly transparent polarization altering elements 230 and may be disposed proximate the surface 222 to change or otherwise alter the first polarization state 205 of at least a portion of the incident light produced by the polarized backlight 215 to provide light having a changed second polarization state. The polarization state of light passing through the carrier 225 but NOT passing through a polarizing element 230 is changed to a third polarization state that differs in one or more characteristics from light having the first polarization state 205 (i.e., light from the source 105) and light having the changed second polarization state (i.e., light exiting from one of the polarization altering elements 230).

The differing changed second and third polarization states of the light exiting the display layer 220 enables the "reading" of the pattern of polarizing elements 230 using a detector 235 of the optical pointer 245, the detector 235 capable of distinguishing the second and third changed polarization states. Reading the pattern of polarizing elements is possible based upon the detectors ability to discern the changed second polarization state of light exiting the polarizing elements 230 from the background changed second polarization state of light exiting the carrier 225.

Based upon encoded absolute positional information between the visibly transparent polarizing elements 230, the detector 235 may determine its location on the surface 222 of the display layer 220. The pattern and density of the visibly transparent polarizing elements 230 may contribute to the accuracy of the detector 235 in determining its location with respect to the display layer 220. A higher density pattern of visibly transparent polarizing elements 230 disposed across the surface 222 of the display layer 220 may generally improve the accuracy of the location determination by the detector 235. Based upon the encoded absolute positional information between the visibly transparent polarizing elements 230, an extremely precise determination of detector 235 location with respect to the pattern of polarizing elements 230 is possible.

A carrier 225 having predetermined pattern of visibly transparent polarizing elements 230 disposed therein can be disposed proximate the surface 222 to change or otherwise alter the first polarization state 205 to provide light having a changed second polarization state (for light passing through the polarizing element 130) and a changed third polarization state (for light passing through the carrier 225). The predetermined pattern of visibly transparent polarizing elements 125 may be applied directly to the surface 222 of the display layer 220. However, in other embodiments, the predetermined pattern of visibly transparent polarizing elements 130 may be applied to a substrate or carrier, for example a material that does not affect the polarization state of light transiting the substrate or carrier, that can in turn be applied to the surface 222 of the display layer 220 via a bonding agent.

The polarization state of light passing through each the transparent polarizing elements 230 disposed on the surface 222 of the display layer 220 can be altered or otherwise changed based upon polarizing element 230 physical characteristics, composition, or any combination thereof. Each of the transparent polarizing elements 230 can be composed of a material, for example a polymeric material, capable of transforming or otherwise altering the polarization state of light passing through the polarizing element. For example, linear vertically polarized light generated by a source and passing through a polarizing element 230 may be phase retarded ¼ wave in one direction, for example left or right, while the linear polarized light passing through only the carrier 225 may be phase retarded ¼ wave in the opposite direction. Other changes in polarization state of the light passing through the carrier 225, the polarizing elements 230, or both may be used. Similarly, any polarized backlight 215 may be used such that the changed second polarization state of the light passing only through the polarizing elements 230 is distinguishable from the changed third polarization state of the light passing only through the carrier 225.

When disposed upon or formed within a suitable carrier 225, the visibly transparent polarizing elements 230 may not be visible to the naked eye when back illuminated (for example, when back illuminated by the polarized backlight 215). The visibly transparent polarizing elements 230 may be deposited on or otherwise formed within the substrate using any method or system, including but not limited to, photolithography and conventional printing technologies.

The polarizing elements 230 can be disposed within the carrier 225 in a unique, specific, spatial or positional pattern. The use of such a pattern creates a geometric relationship between the polarizing elements 230 and their location on the display layer 220. The geometric relationship between the polarizing elements 230 and the display layer 220 permit the ability to determine the location of the detector 235 sensitive to the changed second polarization state of the light emitted by the polarizing elements 230 when the detector 235 is disposed proximate the display layer 220.

The pattern of light having the changed second polarization state sensed by the detector 235 may permit the precise determination of the physical location of the detector 235 on the display layer 220. Increasing the number or density of the polarizing elements 230 (for example by forming greater numbers of physically smaller, closer grouped polarizing elements 230) enhances the location detection capability of the detector 235. The size of each of the polarizing elements 230 can vary based on factors such as desired resolution, mastering technique, and the overall size of the display layer 220 however in general the size of the polarizing elements 230 is on the order of 40 microns and can be as small 5 to 10 microns diameter.

An example pattern capable of providing unique encoded absolute positional information between the visibly transparent polarizing elements 230 is the Anoto® dot pattern provided by Anoto Group AB (Lund, Sweden). Disposing the polarizing elements 230 in an Anoto compliant pattern provides a unique location identification system using the detector 235 capable of detecting the changed second polarization state of the light passing through the polarizing elements 230. Although the Anoto dot pattern is used as an illustrative example, any comparable predetermined pattern capable of providing unique encoded absolute positional information between the visibly transparent polarizing elements 230 may be similarly employed to dispose or locate the polarizing elements 230 in, on, or about the carrier 225.

The detector 235 can include any device, system, or combination of systems and devices suitable for detecting the changed second polarization state of the light exiting the polarizing element 230. For example, a detector 235 sensitive to the changed second polarization state of the light exiting the polarizing elements 230 can incorporate a Wollaston prism, similar in technology to that used in magneto-optical data storage devices, to identify light having the changed second polarization state. Alternatively, a circular polarizer of appropriate handedness could be used to discriminate patterns that use ¼ wave polarizing elements 230. Other polarization sensitive technologies with similar performance can be used as the basis for the detector 235.

Where the detector 235 will be used as an input device to a tablet or where the detector 235 will be used similar to a drafting pen, physical displacement of the detector 235 across the surface 222 of the display layer 220 affects the scan rate, exposure, and blur reduction capabilities of the detector 235 to properly discern the pattern of polarizing elements 230. Additional logic can therefore be incorporated into the detector 235 to increase or decrease the detector scan rate based at least in part upon the velocity with which the detector is moved across the surface 222 of the display layer 220. Similarly, the logic providing for exposure compensation and blur reduction can also be incorporated into the detector 235 based at least in part upon the velocity with which the detector is moved across the surface 222 of the display layer 220.

The second positional input system 200 may be used in connection with a computer such as the computer 110 of FIG. 1. The computer 110 may interact with the optical pointer 245 and the display 210 to produce an illumination area 255 within graphics, such as a dark area of graphics 250 in this example, in order to improve performance of the optical pointer 245 and the detector 235 in determining a position based on light passing through the display layer 220, the carrier 225 and/or the polarizing elements 230.

Figure 4:
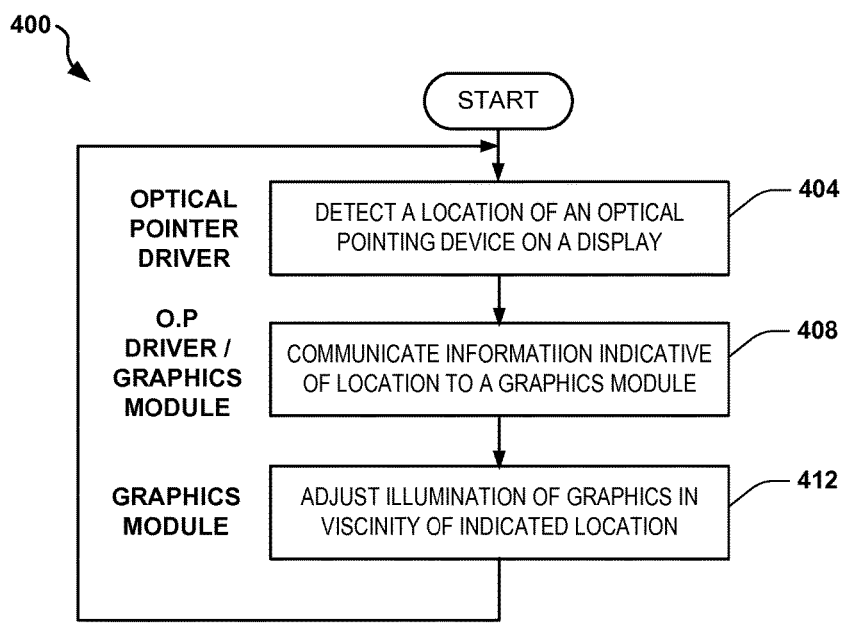
FIG. 4 illustrates a flow diagram for an example process performed by an example positional input system.

FIG. 4 illustrates an example flow diagram for a process 400 that may be performed by a positional input system. In various examples, the process 400 may be performed, at least in part, by one of the positional input systems 100 and 200 of FIGS. 1, 2 and 3. The process 400 will be described with further reference to FIGS. 1, 2 and 3.

The process 400 may begin with the optical pointer driver 115 receiving a signal from one of the optical pointers 145 or 245 detecting a location of the optical pointer 145 or 245 on the display 140 or 210 (block 404). The signal may include coordinates of the location or may include other information that the optical pointer driver 115 may use to determine the location.

Upon detecting the location of the optical pointer 145 or 245, the optical pointer driver 115 may communicate information indicative of the location to the graphics module 120 (block 408). Alternatively, the optical pointer driver 115 may communicate adjusted illumination information to be applied in a vicinity of the location to the graphics driver 120.

The graphics driver 120 may adjust illumination of graphics in a vicinity of the location indicated by the optical pointer driver 115 (block 412). This may involve the graphics driver 120 modifying portions of a frame buffer, an overlay buffer or a refresh pipeline that then causes the graphics card 125 to display the adjusted illumination area 155 or 255 in the vicinity of the location indicated by the optical pointer driver 115. In some examples, the adjusted illumination in the illumination area 155 or 255 may be generated by the a graphics controller, or by a separate process (e.g., the optical pointer driver 115) which renders the adjusted illumination information into the frame buffer or overlay planes.

The process 400 illustrated in FIG. 4 is an example only and not limiting. In various examples, the process 400 may be altered, for example, by having steps or blocks added, removed, rearranged, combined, and/or performed concurrently.

Figure 5:
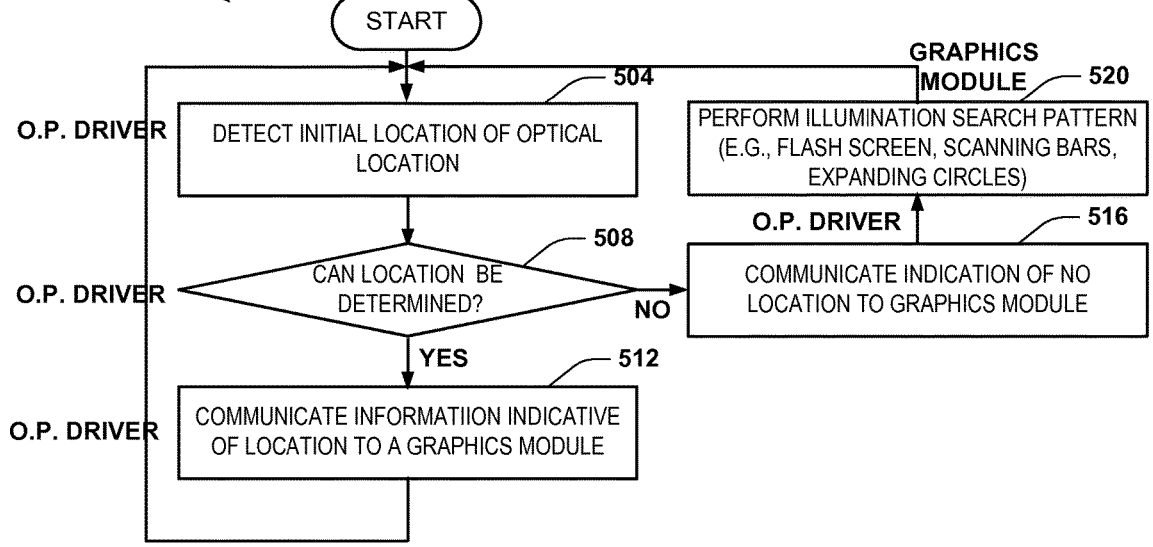
FIG. 5 illustrates a flow diagram for another example process performed by an example positional input system.

FIG. 5 illustrates an example flow diagram for a process 500 that may be performed by a positional input system. In various examples, the process 500 may be performed, at least in part, by one of the positional input systems 100 and 200 of FIGS. 1, 2 and 3. The process 500 may be performed when the optical pointer 145 or 245 is unable to detect its location in the display 140 or 210. This may be due to a dark image obscuring the polarization altering elements 230 in the vicinity of the optical pointer 145 or 245. The process 500 will be described with further reference to FIGS. 1, 2 and 3.

The process 500 may start with the optical pointer driver 115 receiving a signal from one of the optical pointers 145 or 245 indicating the detection of a location of the optical pointer 145 or 245 on the display 140 or 210, or indicating an inability to detect the location (block 504). The signal may include coordinates of the location or may include a flag indicating the inability to detect the location.

The optical pointer driver 115 determines (decision block 508) if the location can be determined. If the location of the optical pointer 145 or 245 can be determined, the process 500 continues to block 512. However, if the location cannot be determined, the process 500 continues to block 516 where the optical pointer driver 115 communicates an indication of the inability to detect the location to the graphics driver 120 or to a graphics module within the optical pointer driver 115, for example.

Upon receiving the communication indicating the inability to detect the location, one of the optical pointer driver 115 or the graphics driver 120 may cause an illumination search pattern to be generated on the display 140 or 210 (block 520). This illumination search pattern is configured to ensure that there is adequate illumination for the optical pointer 145 or 245 to detect the position elements. The illumination search pattern could be a scanning bar pattern (e.g., one or more columns or rows of pixels) or an expanding circle or ellipse centered at the last known location of the optical pointer 145 or 245, for example. Alternatively, the entire display 140 or 210 could be briefly (e.g., one frame time) flashed to a lighter color. This could be accomplished by writing into the frame buffer, or by modifying a color map.

Subsequent to generating the illumination search pattern at block 520, the process continues back to block 504 and decision block 508 until the location is detected and then the process 500 continues to block 512.

At block 512, the optical pointer driver 115 may communicate information indicative of the location to the graphics module 120 as was described above in reference to block 408 of the process 400. Alternatively, the optical pointer driver 115 may communicate adjusted illumination information to be applied in a vicinity of the location to the graphics driver 120.

The process 500 illustrated in FIG. 5 is an example only and not limiting. In various examples, the process 500 may be altered, for example, by having steps or blocks added, removed, rearranged, combined, and/or performed concurrently.

Figure 6:
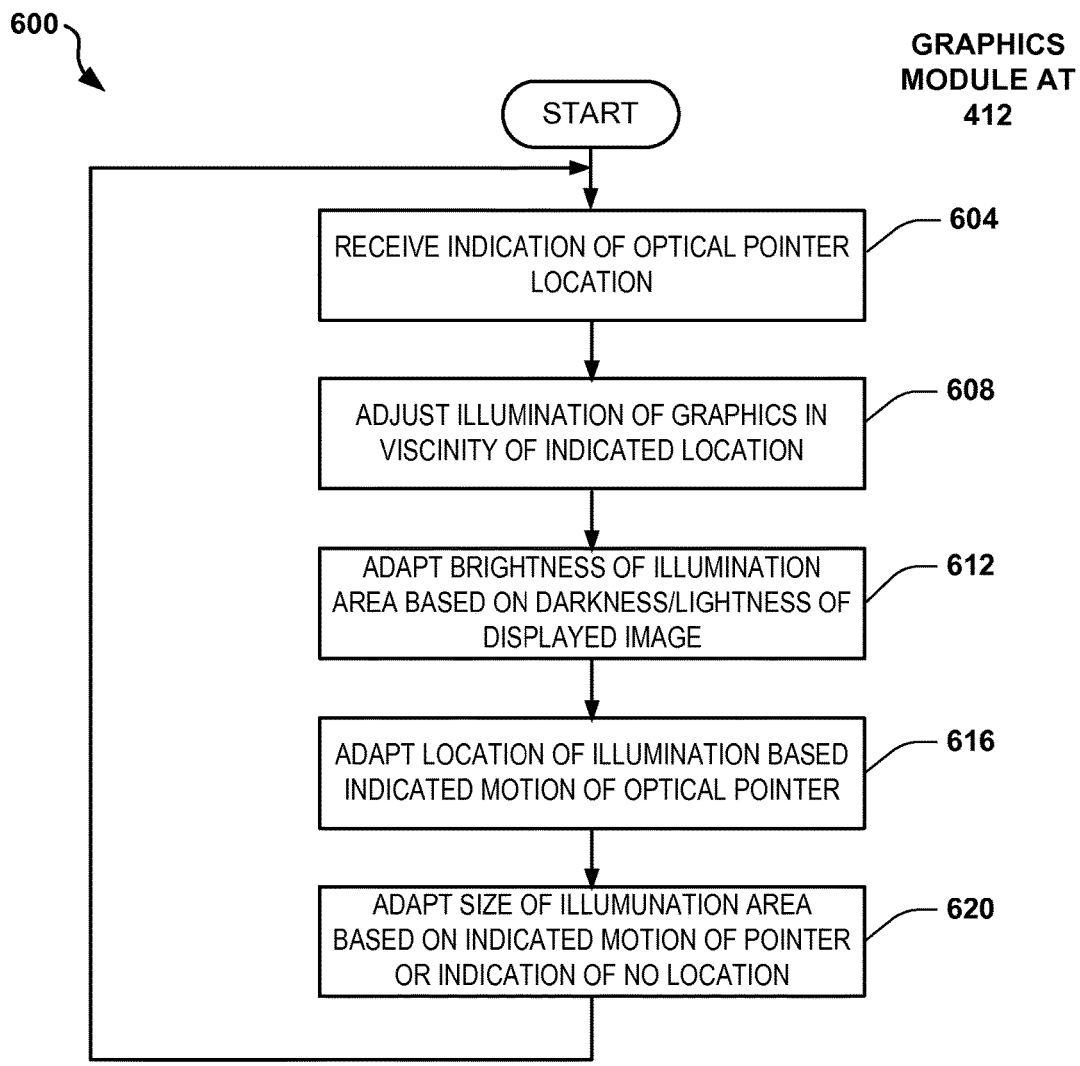
FIG. 6 illustrates a flow diagram for another example process performed by an example positional input system.

FIG. 6 illustrates an example flow diagram for a process 600 that may be performed by a positional input system. In various examples, the process 600 may be performed, at least in part, by one of the positional input systems 100 and 200 of FIGS. 1, 2 and 3. The process 600 may be performed by the graphics driver 120 or the optical pointer driver 115, or a combination of both, while adjusting the illumination of the illumination area 155 or 255 at block 412 of the process 400 described above. The process 600 will be described with further reference to FIGS. 1, 2 and 3.

The process 600 may start with the optical pointer driver 115 or the graphics driver 120 receiving a signal from one of the optical pointers 145 or 245 indicating the detection of a location of the optical pointer 145 or 245 on the display 140 or 210 (block 604). The signal may include coordinates of the location.

Upon receiving the location indication, the optical pointer driver 115 or the graphics driver 120 may adjust illumination of graphics in a vicinity of the location indicated by the optical pointer driver 115 (block 608). This may involve modifying portions of a frame buffer, an overlay buffer or a refresh pipeline that then causes the graphics card 125 to display the adjusted illumination area 155 or 255 in the vicinity of the indicated location.

At block 612, the optical pointer driver 115 or the graphics driver 120 may adapt a brightness of the illumination area 155 or 255 based on a darkness or lightness of an image displayed in the vicinity of the indicated location. The illumination area may only need to be generated in areas of the image that do not supply sufficient light intensity for the optical pointer 145 or 245 to detect the location. The illumination area 155 or 255 may not need to appear, or may be generated to be less bright, if the normal image intensity provided by the displayed image is sufficient, or nearly sufficient, to allow detection of the location. This adaptation of the illumination area 155 or 255 brightness may be made adaptive, with the optical pointer 145 or 245 communicating a signal indicating an inability to detect the location. In addition, an intensity profile of the illumination area 155 or 255 may be varied (e.g., soft edges might make it more visually appealing, or forming of a "halo" around the tip of the optical pointer 145 or 245 may be more visually appealing and requested by the user, for example).

At block 616, the optical pointer driver 115 or the graphics driver 120 may adapt a location of the illumination area 155 or 255 based on an indicated motion of the optical pointer 145 or 245. As discussed above, this could enable the illumination area 155 or 255 to track the motion of the optical pointer 145 or 245.

At block 620, the optical pointer driver 115 or the graphics driver 120 may adapt a size of the illumination area 155 or 255 based on an indicated motion of the optical pointer 145 or 245, or, alternatively, in response to an indication that the optical pointer is unable to detect the location. For example, the size may be increased in response to quicker motion, and reduced in response to slower motion. Alternatively, the size of the illumination area could be a function of the spacing of the polarization altering elements 230, or a function of the viewing angle of the tip of the optical pointer 145 or 245.

The process 600 illustrated in FIG. 6 is an example only and not limiting. In various examples, the process 600 may be altered, for example, by having steps or blocks added, removed, rearranged, combined, and/or performed concurrently.

Various examples described herein are described in the general context of method steps or processes, which may be implemented in one example by a software program product or component, embodied in a machine-readable medium, including executable instructions, such as program code, executed by entities in networked environments. Generally, program modules may include routines, programs, objects, components, data structures, etc. which may be designed to perform particular tasks or implement particular abstract data types. Executable instructions, associated data structures, and program modules represent examples of program code for executing steps of the methods disclosed herein. The particular sequence of such executable instructions or associated data structures represents examples of corresponding acts for implementing the functions described in such steps or processes.

Software implementations of various examples can be accomplished with standard programming techniques with rule-based logic and other logic to accomplish various database searching steps or processes, correlation steps or processes, comparison steps or processes and decision steps or processes.

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products.

It is also noted herein that while the above describes examples, these descriptions should not be viewed in a limiting sense. Rather, there are several variations and modifications which may be made without departing from the scope as defined in the appended claims.

What is claimed is:

1. A system, comprising:
    a display including a display layer and pattern elements;
    an optical pointer driver to receive an indication of an optical pointer location on the display; and
    a graphics driver to receive the indication of the optical pointer location and, in response to the indication, adjust an illumination of graphics on the display layer in a vicinity of the indicated location, wherein pixels below a threshold illumination in the vicinity are adjusted to increase resolution of pattern elements and wherein pixels above the threshold illumination in the vicinity are left unadjusted.

2. The system of claim 1, further comprising an optical pointer coupled to the optical pointer driver, the optical pointer for detecting the location and communicating the indication of the location to the optical pointer driver.

3. The system of claim 1, wherein the optical pointer driver is further to receive an indication that the optical pointer location is not determined and, in response, cause the graphics driver to generate an illumination search pattern at different locations of the display until the indication of the optical pointer location is received.

4. The system of claim 1, wherein the graphics driver is further to adapt a brightness of the illumination of the graphics based on a brightness of a displayed image in the vicinity of the indicated location.

5. The system of claim 1, wherein the graphics driver is for adapting a size of the illumination of the graphics in the vicinity of the indicated location based on an indicated motion of the optical pointer location.

6. The system of claim 1, wherein the graphics driver is to adjust illumination of graphics in a frame buffer.

7. The system of claim 1, wherein the pattern elements are to adjust a polarization of light emitted by the display.

8. The system of claim 7, where the display is to generate light having three different polarizations.

9. The system of claim 1, wherein the optical pointer is to detect a polarization of received light.

10. A method, comprising:
receiving an indication of a location of an optical pointer on a display screen, the display screen including a display layer and pattern elements;
adjusting, in response to the indication, an illumination of graphics on the display layer of the display screen in a vicinity of the indicated location, the adjusting being to increase contrast between the graphics and the pattern elements; and
subsequent to receiving a signal indicating failure to identify the indicated location on the display screen, temporarily applying a search pattern to the display screen until the indicated location on the display screen is identified.

11. The method of claim 10, further comprising:
detecting the location; and
communicating information indicative of the position to a graphics driver for the adjusting.

12. The method of claim 10, further comprising:
receiving an indication that the optical pointer location is not determined; and
in response to receiving the indication that the optical pointer location is not determined, generating an illumination search pattern at different locations of the display until the indication of the optical pointer location is received.

13. The method of claim 10, further comprising adapting a brightness of the illumination of the graphics based on a brightness of a displayed image in the vicinity of the indicated location.

14. The method of claim 10, further comprising adapting at least one of a size or a location of the illumination of graphics in the vicinity of the indicated location based on an indicated motion of the optical pointer location.

15. The method of claim 10, wherein the search pattern is located at a position extrapolated from a motion vector of previous indicated positions.

16. An apparatus, comprising:
a processor; and
a memory device including computer program code, the memory device and the computer program code, with the processor, to cause the apparatus to:
receive an indication of a location of an optical pointer on a display, the display including a display layer and pattern elements; and
adjust, in response to the indication, an illumination of graphics on the display layer of the display in a vicinity of the indicated location to increase contrast between the graphics and the pattern elements, wherein a size of the vicinity adjusted depends on motion of the location indicated by the optical pointer on the display.

17. The apparatus of claim 16, wherein the computer program code, with the processor, further cause the apparatus to:
detect the location; and
communicate information indicative of the position to a graphics driver for the adjusting.

18. The apparatus of claim 16, wherein the computer program code, with the processor, further cause the apparatus to:
receive an indication that the optical pointer location is not determined; and
in response to receiving the indication that the optical pointer location is not determined, perform an illumination search pattern operation at different locations of the display screen until the indication of the optical pointer location is received.

19. The apparatus of claim 16, wherein the computer program code, with the processor, further cause the apparatus to adapt a brightness of the illumination of the graphics based on a brightness of a displayed image in the vicinity of the indicated location.

20. The apparatus of claim 16, wherein the computer program code, with the processor, further cause the apparatus to adapt at least one of a size or a location of the illumination of graphics in the vicinity of the indicated location based on an indicated motion of the optical pointer location.

* * * * *

UNITED STATES PATENT AND TRADEMARK OFFICE
CERTIFICATE OF CORRECTION

PATENT NO. : 10,318,014 B2  
APPLICATION NO. : 15/114743  
DATED : June 11, 2019  
INVENTOR(S) : Robert Paul Martin Page 1 of 1

It is certified that error appears in the above-identified patent and that said Letters Patent is hereby corrected as shown below:

In the Drawings

In sheet 3 of 4, FIG. 4, reference numeral 408, Line 1, delete "INFORMATIION" and insert -- INFORMATION --, therefor.

In sheet 3 of 4, FIG. 4, reference numeral 412, Line 2, delete "VISCINITY" and insert -- VICINITY --, therefor.

In sheet 3 of 4, FIG. 5, reference numeral 512, Line 1, delete "INFORMATIION" and insert -- INFORMATION --, therefor.

In sheet 4 of 4, FIG. 6, reference numeral 608, Line 2, delete "VISCINITY" and insert -- VICINITY --, therefor.

In sheet 4 of 4, FIG. 6, reference numeral 620, Line 1, delete "ILLUMUNATION" and insert -- ILLUMINATION --, therefor.

Signed and Sealed this  
Twenty-second Day of October, 2019

Andrei Iancu  
*Director of the United States Patent and Trademark Office*